United States Patent [19]

Hasuo et al.

[11] Patent Number: 4,734,488

[45] Date of Patent: Mar. 29, 1988

[54] POLYCARBONATE AND OPTICAL DISC SUBSTRATE

[75] Inventors: Masayoshi Hasuo, Yokohama; Seiichi Mukai, Kunitachi; Hiroshi Urabe; Seiji Yoshida, both of Kawasaki; Masahiro Nukui, Sagamihara, all of Japan

[73] Assignee: Mitsubishi Chemical Industries Ltd., Tokyo, Japan

[21] Appl. No.: 65,136

[22] Filed: Jun. 25, 1987

Related U.S. Application Data

[63] Continuation of Ser. No. 765,801, Aug. 15, 1985, abandoned.

[30] Foreign Application Priority Data

Aug. 24, 1984 [JP] Japan .................. 59-175079

[51] Int. Cl.$^4$ .............................................. C08G 63/62
[52] U.S. Cl. .................................. 528/196; 528/202; 528/204; 528/372
[58] Field of Search ............... 528/196, 202, 204, 370, 528/372; 428/412

[56] References Cited

U.S. PATENT DOCUMENTS 4,495,345  1/1985  Kawakami et al. ................ 528/372
4,529,791  7/1985  Glass ................................. 528/196

FOREIGN PATENT DOCUMENTS 0089801  9/1983  European Pat. Off. .
3343898  6/1984  Fed. Rep. of Germany .
3423864  1/1985  Fed. Rep. of Germany .
2377267  1/1978  France .

Primary Examiner—Theodore E. Pertilla
Attorney, Agent, or Firm—Oblon, Fisher, Spivak, McClelland & Maier

[57] ABSTRACT

A polycarbonate containing from 25 to 100% by weight, based on the total carbonate bond-constituting units, of carbonate bond-constituting units each containing at least one pendant aromatic group, and having an average molecular weight of from 9,500 to 14,000.

5 Claims, No Drawings

POLYCARBONATE AND OPTICAL DISC SUBSTRATE

This application is a continuation of application Ser. No. 765,802 filed on Aug. 15, 1985 now abandoned.

The present invention relates to a polycarbonate resin containing from 25 to 100% by weight, based on the total carbonate bond-constituting units, of carbonate bond-constituting units each containing at least one pendant aromatic group. Particularly, it relates to a material useful for the production of a molded product having excellent heat resistance and optical characteristics, and in particular, to a material useful for the production of an optical disc substrate having excellent transparency and a minimum optical distortion.

Heretofore, polycarbonate resins containing carbonate bond-constituting units having at least one pendant aromatic group, have been disclosed in literatures. However, their physical properties are described usually in terms of Tg or Tm, and it is not known whether they have practically suitable physical properties as molded products, or whether they can practically be processed.

A molded product to be used for optical purposes, such as a molded product in the form of a plate or sheet, is required to be transparent and to have a minimum optical distortion. Particularly when used as an optical information material i.e. an optical disc with use of digital signals, such as a digital audio disc, a digital video disc or a disc for information readout or writing in, the requirement for the transparency is extremely strict, and with respect to the optical distortion, the double refraction of the molded product is required to be not higher than $5 \times 10^{-5}$.

It is common to employ injection molding as a simple method for molding a product of this type. However, as a method for minimizing the optical distortion, it is common to raise the molten resin temperature or reduce the molecular weight of the resin to improve the melt flow characteristics.

Furthermore, in the case of a disc intended for continuous use over a long period of time, the requirement for heat resistance is also strict with a view to providing adequate durability for use under severe environmental conditions. If the molten resin temperature is raised to minimize the optical distortion, various troubles are likely to be led resulting from the thermal deterioration of the resin. On the other hand, if the molecular weight of the resin is reduced, the strength of the disc will be inadequate, and it becomes difficult to obtain a satisfactory molded product.

With respect to the glass transition temperature representing the heat resistance, each resin has its own value, and there is no room for improvement.

Thus, the conventional technology does not provide a satisfactory solution.

The present inventors have conducted extensive researches on polycarbonate resins which may be molded by melt-molding and which have superior optical characteristics and heat resistance to polycarbonates prepared from 2,2-bis(4-hydroxyphenyl)propane, and have found that such an object of the present invention can be accomplished by a polycarbonate resin containing carbonate bond-constituting units each having at least one pendant aromatic group and which has a certain specific molecular weight, whereby the problems of the conventional technique can be solved.

Namely, the present invention provides a polycarbonate containing from 25 to 100% by weight, based on the total carbonate bond-constituting units, of carbonate bond-constituting units each containing at least one pendant aromatic group, and having an average molecular weight of from 9,500 to 14,000.

Now, the present invention will be described in detail with reference to the preferred embodiments.

The polycarbonate resin of the present invention contains from 25 to 100% by weight, preferably from 60 to 100% by weight, based on the total carbonate bond-constituting units, of carbonate bond-constituting units each containing at least one pendant aromatic group (hereinafter referred to simply as "carbonate bond units A"), and has an average molecular weight of from 9,500 to 14,000.

The pendant aromatic group is meant for an aryl or aralkyl group.

For the purpose of the present invention, the "carbonate bond" is meant for a

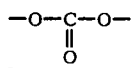

bond obtained by the reaction of an alcoholic hydroxyl group or a phenolic hydroxyl group with e.g. phosgene. The "carbonate bond-constituting unit" is meant for a structural unit between such carbonate bonds. Further, the structural unit between the carbonate bonds may contain other types of bonds such as ester bonds, amide bonds, carbamate bonds or ether bonds.

As the carbonate bond-constituting unit containing at least one pendant aromatic group, there may be mentioned the one having the formula:

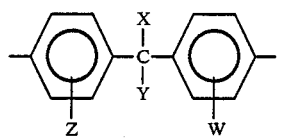

wherein each of X and Y is a hydrogen atom, an aliphatic hydrocarbon group having from 1 to 6 carbon atoms, or an aryl or aralkyl group having from 6 to 12 carbon atoms, provided that at least one of X and Y is an aryl or aralkyl group having from 6 to 12 carbon atoms, and each of Z and W is a hydrogen atom or an aliphatic hydrocarbon group having from 1 to 6 carbon atoms.

Further, as a structural unit which may be contained together with the above structural unit, there may be mentioned one having the formula:

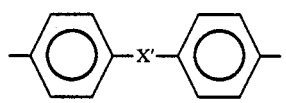

wherein X' is a bivalent group of

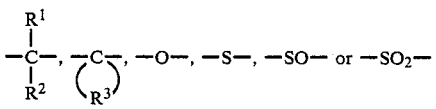

(wherein each of R¹ and R² is a hydrogen atom or an alkyl group having from 1 to 6 carbon atoms, and R³ is an alkylene group having from 4 to 5 carbon atoms), and the aromatic rings may be substituted by an alkyl group or a halogen atom.

For the production of such a polycarbonate, there may be employed a conventional method for interfacial or solution polymerization, wherein phosgene is blown into at least one of diol compounds, particularly aromatic diol compounds, containing at least one pendant aromatic group.

As the diol having at least one pendant aromatic group, particularly an aromatic diol capable of presenting the structural unit of the formula I, there may be mentioned, for instance, bis(4-hydroxyphenyl)-phenylmethane, 1,1-bis(4-hydroxyphenyl)-1-phenylethane, 1,1-bis(4-hydroxyphenyl)-1-phenylpropane, bis(4-hydroxyphenyl)diphenylmethane, bis(4-hydroxyphenyl)dibenzylmethane, o-cumyl resorcinol, or phenolphthalein.

In the present invention, carbonate bond-constituting units containing no pendant aromatic group may also be introduced. Such introduction improves the melt flow characteristics of the resulting polycarbonate and thus is preferred for the improvement of moldability. However, if the amount of the units containing pendant aromatic groups is less than 25% by weight, the glass transition temperature of the polymer lowers to a great extent, such being undesirable not only from the viewpoint of heat resistance, but also from the viewpoint of the preparation of an optical disc substrate having a minimum optical distortion. As the comonomer to be used in such a case, there may be mentioned as the one capable of presenting the structural unit of the formula II, 1,1-bis(4-hydroxyphenyl)methane, 1,1-bis(4-hydroxyphenyl)ethane, 1,1-bis(4-hydroxyphenyl)propane, 2,2-bis(4-hydroxyphenyl)propane (i.e. bisphenol A), 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 1,1-bis(4-hydroxyphenyl)cyclohexane, 2,2-bis(4-hydroxy-3-chlorophenyl)propane, 2,2-bis(4-hydroxy-3-methylphenyl)propane, 4,4'-dihydroxydiphenyl ether, 4,4'-dihydroxydiphenyl sulfide or a bivalent phenol compound such as resorcinol or o-methyl resorcinol. Further, in some cases, a small amount of an acid chloride such as isophthalic acid chloride, adipic acid chloride or sebacic acid chloride, or a diamine such as piperazine, may be present for the copolymerization to introduce a bond other than the carbonate bond into the carbonate bond-constituting unit.

For the introduction of carbonate bond-constituting units other than the carbonate bond units A, copolymerization may be conducted within a range which satisfies the requirements of the present invention, or polymers separately produced may be mixed to satisfy the requirements of the present invention.

The method for the production of a polycarbonate resin from a diol containing at least one pendant aromatic group and phosgene, may be carried out by introducing into the diol an aqueous alkaline solution or pyridine as an acid acceptor in the presence of an inert solvent such as methylene chloride or 1,2-dichloromethane and introducing and reacting phosgene therewith. When an aqueous alkaline solution is used as the acid acceptor, the reaction rate can be increased by using as the catalyst a tertiary amine such as trimethylamine or triethylamine or a quarternary ammonium compound such as tetrabutyl ammonium chloride or benzyltributyl ammonium bromide. If necessary, a monovalent phenol such as phenol or p-tert-butylphenol may be used as a molecular weight modifier. The reaction is conducted usually at a temperature of from 0° to 100° C. The catalyst may be present from the initial stage, or may be added after the preparation of an oligomer, followed by further polymerization.

For the copolymerization of the above-mentioned copolymerizable compound with a diol having at least one pendant aromatic group, there may be employed (a) a method wherein they may be simultaneously reacted with phosgene and polymerized, (b) a method wherein one of them is firstly reacted with phosgene, and after the reaction has proceeded to some extent, the other compound is introduced for polymerization, or (c) a method wherein the two compounds are reacted with phosgene separately to produce the respective oligomers, which are then reacted for polymerization.

As a method for mixing the polymers separately prepared, there may be mentioned a method wherein the respective powders or granules are mixed, and then meltmixed by means of e.g. an extruder, a kneader or mixing rolls, or a solution blending method.

The polycarbonate to be used in the present invention preferably has an average molecular weight of 9,500 to 14,000. The average molecular weight here is meant for a value obtained from $\eta$sp as measured at 20° C. by using a methylene chloride solution containing 6.0 g/liter of the polymer, by calculation in accordance with the following formula 1 and formula 2.

$$\eta\ sp/c = [\eta](1 + K'\ \eta sp) \tag{1}$$

$$[\eta] = KM^\alpha \tag{2}$$

In the above formulas, c is the polymer concentration (g/liter), $[\eta]$ is the intrinsic viscosity, $K'$ is 0.28, K is $1.23 \times 10^{-5}$, $\alpha$ is 0.83, and M is the average molecular weight.

Namely, if the average molecular weight is less than 9,500, the mechanical properties will be inferior, and if the average molecular weight exceeds 14,000, it will be difficult to obtain a molding material having a minimum optical distortion.

When the polycarbonate of the present invention is to be molded, it is preferred to add from 0.01 to 2% by weight of a phosphite to the resin, whereby the coloring or the deterioration of transparency due to the decomposition of the resin can be controlled. As such a phosphite, there may be mentioned tributyl phosphite, tris(2-ethylhexyl) phosphite, tridecyl phosphite, tristearyl phosphite, triphenyl phosphite, tricresyl phosphite, 2-ethylhexyldiphenyl phosphite, decyldiphenyl phosphite, tricylohexyl phosphite or distearyl pentaerythrityl diphosphite. Such a phosphite may be incorporated by dry blending, by melt mixing at the time of pelletizing by means of an extruder, or by preparing master pellets having a high phosphite concentration and dry blending them with pellets containing no phosphite.

The molding material of the present invention is a polycarbonate resin which has excellent heat resistance and optical characteristics and which is capable of being molded by melt molding, and thus is useful for the production of an optical information material such as an optical disc, lens or optical fiber. The polycarbonate of the present invention is particularly useful as a material for the optical disc. The optical disc here includes a disc for replay only such as a compact disc or a laser disc, a write-once type disc useful for a document file, a still image file or a moving image file, and an erasable type disc such as a photomagnetic disc. The present invention is particularly useful for e.g. the erasable optical disc where the heat resistance is particularly important.

Now, the present invention will be described in further detail with reference to Examples. However, it should be understood that the present invention is by no means restricted by these specific Examples.

The Examples illustrate specific manners for the preparation of the polycarbonates of the present invention and their oligomers. In the Examples, the "parts" represents "parts by weight".

The resin obtained in each Example or Comparative Example was, after an addition of 130 ppm of 2-ethylhexyl diphenylphosphite, molded into a disc having a thickness of 1.2 mm and a diameter of 10 cm at a molding temperature of 340° C. by means of a 1 ounce injection molding machine (manufactured by Nissei Jushi) under the molding conditions identified in Table 1.

At the same time, the apparent melt viscosity $\eta a$ was measured at 280° C. at a shear rate of $10^3$ sec$^{-1}$ by a flow tester, and used as a reference for the melt flow characteristics.

The double refraction was evaluated by the double refraction at positions of 2.0 cm and 4.5 cm from the center of the disc (hereinafter referred to as "$\Delta n_{2.0}$" and "$\Delta n_{4.5}$", respectively). The double refraction was measured by polarizing microscope manufactured by Nippon Kogaku K.K.

The tensile property was measured by a tensile tester at a tensile speed of 5 mm/min in accordance with ASTM D638.

The glass transition temperature (Tg) was measured by a differential scanning calorimeter (manufactured by Perkin Elmer Co.).

The results of the measurements in each Example are shown in Table 1.

EXAMPLE 1

| Preparation of polycarbonate | |
|---|---|
| 1,1-bis(4-hydroxyphenyl)-1-phenylethane | 100 parts |
| p-tert-Butylphenol | 1.3 parts |
| Pyridine | 209 parts |
| Methylene chloride | 1000 parts |

The above mixture was charged into a reactor equipped with a stirrer and stirred at 500 rpm.

Then, 50 parts of phosgene was blown into it over a period of one hour, whereby solution polymerization was conducted.

After the completion of the reaction, excess pyridine was neutralized by an aqueous hydrochloric acid solution, and the product was washed with water, an aqueous hydrochloric acid solution and then water, and finally methylene chloride was evaporated to obtain the resin.

The average molecular weight of this resin was 10,400.

EXAMPLE 2

| Preparation of polycarbonate | |
|---|---|
| 1,1-bis(4-hydroxyphenyl)-1-phenylethane | 100 parts |
| 2,2-bis(4-hydroxy-3-methylphenyl)-propane | 30 parts |
| p-tert-Butylphenol | 1.0 part |
| Pyridine | 500 parts |
| Methylene chloride | 2300 parts |

The above mixture was charged into a reactor equipped with a stirrer and stirred at 500 rpm.

Then, 50 parts of phosgene was blown into it over a period of one hour, whereby solution polymerization was conducted. After the completion of the reaction, excess pyridine was neutralized by an aqueous hydrochloric acid solution, and the product was washed with water, an aqueous hydrochloric acid solution and then water, and finally methylene chloride was evaporated to obtain the resin.

The average molecular weight of this resin was 11,000. From the result of the NMR analysis, copolymerized 2,2-bis(4-hydroxy-3-methylphenyl)propane was found to be 23% by weight.

EXAMPLE 3

| Preparation of polycarbonate oligomer | |
|---|---|
| 1,1-bis(4-hydroxyphenyl)-1-phenylethane | 100 parts |
| Sodium hydroxide | 40 parts |
| Water | 600 parts |
| Methylene chloride | 375 parts |

The above mixture was charged into a reactor equipped with a stirrer and stirred at 800 rpm. Then, 57 parts of phosgene was blown into it over a period of one hour, whereby interfacital polymerization was conducted. After the completion of the reaction, the methylene chloride solution containing a polycarbonate oligomer was separated. The methylene chloride solution of the oligomer thus obtained was analyzed. The results were as follows.

| Oligomer concentration | 22.5% by weight | (Note 1) |
|---|---|---|
| Terminal chloroformate group concentration | 0.42 N | (Note 2) |
| Terminal phenolic hydroxyl group concentration | 0.020 N | (Note 3) |

The oligomer solution obtained by the above process will be referred to as "oligomer solution A".

Note 1: Measured by evaporation to dryness.
Note 2: The aniline hydrochloride obtained by the reaction with aniline was measured by neutralization titration with a 0.2 N sodium hydroxide aqueous solution.
Note 3: The color development when dissolved in an acetic acid solution of titanium tetrachloride was measured by colorimetry at 546 nm.

EXAMPLE 4

| Preparation of polycarbonate | |
|---|---|
| Polycarbonate oligomer solution A | 140 parts |
| p-tert-Butylphenol | 1.9 parts |
| Methylene chloride | 80 parts |

The above mixture was charged into a reactor equipped with a stirrer and stirred at 550 rpm. Then, an aqueous solution having the following composition was added:

| | |
|---|---|
| 7.3% Aqueous solution of sodium hydroxide | 80 parts |
| 2% Aqueous solution solution of triethylamine | 1 part |

Interfacial polymerization was conducted for 3 hours. The reaction mixture was subjected to liquid separation. The methylene chloride solution containing a polycarbonate resin was washed with water, an aqueous hydrochloric acid solution and then water, and finally methylene chloride was evaporated to obtain the resin.

The average molecular weight of this resin was 11,200.

COMPARATIVE EXAMPLE 1

Preparation of polycarbonate

A polycarbonate was prepared in the same manner as in Example 4 except that the amount of p-tert-butylphenol was changed to 1.5 parts. The average molecular weight of this resin was 7,800.

COMPARATIVE EXAMPLE 2

Preparation of polycarbonate

A polycarbonate was prepared in the same manner as in Example 4 except that the amount of p-tert-butylphenol was changed to 0.5 part. The average molecular weight of this resin was 16,900.

COMPARATIVE EXAMPLE 3

| Preparation of polycarbonate oligomer | |
|---|---|
| 16.6% aqueous solution of a sodium salt of bisphenol A prepared by dissolving bisphenol A in an aqueous sodium hydroxide solution | 100 parts |
| p-tert-Butylphenol | 0.23 part |
| Methylene chloride | 40 parts |
| Phosgene | 7 parts |

The mixture having the above composition was quantitatively supplied to a pipe reactor, and interfacial polymerization was conducted.

The reaction mixture was subjected to liquid separation. The methylene chloride solution containing a polycarbonate oligomer was separated.

The methylene chloride solution of the oligomer thus obtained was analyzed. The results are as shown below.

| | |
|---|---|
| Oligomer concentration | 24.5% by weight |
| Terminal chloroformate group concentration | 1.3 N |
| Terminal phenolic hydroxyl group concentration | 0.3 N |

The oligomer solution obtained by the above process will be referred to as "oligomer solution B".

COMPARATIVE EXAMPLE 4

| Preparation of polycarbonate | |
|---|---|
| Polycarbonate oligomer solution B | 160 parts |
| p-tert-Butylphenol | 0.7 part |
| Methylene chloride | 130 parts |

The above mixture was charged into a reactor equipped with a stirrer and stirred at 550 rpm. Then, an aqueous solution having the following composition was added:

| | |
|---|---|
| 16.6% Aqueous solution of a sodium salt of bisphenol A | 80 parts |
| 25% Aqueous solution of sodium hydroxide | 8 parts |
| 2% Aqueous solution of triethylamine | 1 part |

Interfacial polymerization was conducted for about 1.5 hours. The reaction mixture was subjected to liquid separation. The methylene chloride solution containing a polycarbonate resin was washed with water, an aqueous hydrochloric acid solution and then water, and finally methylene chloride was evaporated to obtain the resin.

The average molecular weight of this resin was 17,400.

COMPARATIVE EXAMPLE 5

Preparation of polycarbonate

A polycarbonate was prepared in the same manner as in Comparative Example 4 except that the amount of p-tert-butylphenol was changed to 1.3 parts. The average molecular weight of this resin was 14,700.

COMAPRATIVE EXAMPLE 6

Preparation of polycarbonate

A polycarbonate was prepared in the same manner as in Comparative Example 4 except that the amount of p-tertbutylphenol was changed to 2.0 parts. The average molecular weight of this resin was 13,000.

TABLE 1

| | Average molecular weight | $\eta a$ (poise) | Tg (°C.) | Injection pressure (kg/cm$^2$) Primary pressure/ Secondary pressure | Double refraction | | Tensile properties | |
|---|---|---|---|---|---|---|---|---|
| | | | | | $\Delta n_{2.0}(\times 10^4)$ | $\Delta n_{4.5}(\times 10^4)$ | Tensile strength (kg/cm$^2$) | Tensile elongation (%) |
| Example 1 | 10,400 | $2.0 \times 10^3$ | 177 | 50/20 | −0.2 | −0.2 | 740 | 10 |
| | | | | 50/25 | 0.1 | −0.2 | | |
| Example 2 | 11,000 | $2.5 \times 10^3$ | 160 | 50/20 | −0.2 | −0.15 | 730 | 12 |
| | | | | 50/25 | 0.1 | −0.2 | | |
| Example 4 | 11,200 | $6.0 \times 10^3$ | 178 | 50/20 | −0.2 | −0.2 | 750 | 13 |
| | | | | 50/25 | 0.1 | −0.2 | | |
| Comparative Example 1 | 7,800 | $1.0 \times 10^3$ | 175 | Too brittle to mold | | | 360 | 3.3 |
| Comparative Example 2 | 16,900 | $2.0 \times 10^4$ | 190 | 60/25 | 3.5 | −2.3 | 740 | 80 |
| | | | | 60/30 | 3.6 | −2.5 | | |
| Comparative Example 4 | 17,400 | $2.5 \times 10^3$ | 150 | 50/20 | 1.8 | −0.7 | 590 | 140 |
| | | | | 50/25 | 2.5 | −0.8 | | |
| Comparative | 14,700 | $1.5 \times 10^3$ | 148 | 40/10 | 0.6 | −0.6 | 590 | 60 |

TABLE 1-continued

| | Average molecular weight | ηa (poise) | Tg (°C.) | Injection pressure (kg/cm$^2$) Primary pressure/ Secondary pressure | Double refraction $\Delta n_{2.0}(\times 10^4)$ | $\Delta n_{4.5}(\times 10^4)$ | Tensile strength (kg/cm$^2$) | Tensile elongation (%) |
|---|---|---|---|---|---|---|---|---|
| Example 5 Comparative Example 6 | 13,000 | 1.0 × 10$^3$ | 146 | 30/10 Too brittle to mold | 0.6 | −0.5 | 220 | 3.0 |

It is evident from the above Table that as compared with the polycarbonate resins of bisphenol A (Comparative Examples 4 to 6), in the polycarbonate resins of the present invention, the double refraction is substantially low, and the variation in Δn is extremely small in spite of the fact that the melt flow characteristics are lowered, and further the heat resistance is substantially improved.

On the other hand, if the average molecular weight is less than 9,500 (Comparative Example 1), no adequate strength will be obtained, and if the average molecular weight exceeds 14,000 (Comparative Example 2), it will be difficult to obtain a molding material having a minimum optical distortion.

We claim:

1. A polycarbonate resin made up of carbonate bonds having the structure

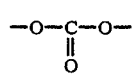

and carbonate bond-constituting units which are structural units between said carbonate bonds, wherein from 25 to 100% of said carbonate bond-constituting units contain at least one pendant aromatic group and have the formula

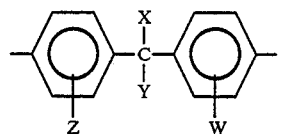

wherein each of X and Y is a hydrogen atom, an aliphatic hydrocarbon group having from 1 to 6 carbon atoms, or an aryl or aralkyl group having from 6 to 12 carbon atoms, provided that at least one of X and Y is an aryl or aralkyl group having from 6 to 12 carbon atoms, and each of Z and W is a hydrogen atom or an aliphatic hydrocarbon group having from 1 to 6 carbon atoms, wherein said polycarbonate resin has an average molecular weight of from 10,400 to 14,000, based on the intrinsic viscosity of said polycarbonate resin at 20° C. in methylene chloride at a concentration of 6.0 g/liter, and wherein the melt flow index of said polycarbonate resin is from 0.86 to 3.2 as measured at 230° C. under a load of 5 kg in accordance with International Standards Organization Reference ISO R-1133.

2. The polycarbonate according to claim 1, which further contains second carbonate bond-constituting units having the formula:

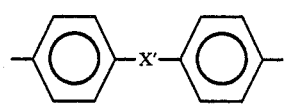

wherein X' is a bivalent group of

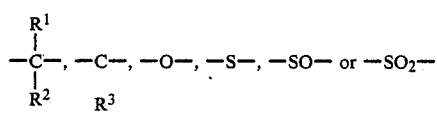

(wherein each of R$^1$ and R$^2$ is a hydrogen atom or an alkyl group having from 1 to 6 carbon atoms, and R$^3$ is an alkylene group having from 4 to 5 carbon atoms), and the aromatic rings may be substituted by an alkyl group or a halogen atom.

3. The polycarbonate according to claim 1, wherein each carbonate bond-constituting unit containing at least one pendant aromatic group is derived from a diol selected from the group consisting of bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, bis(4-hydroxyphenyl)dibenzylmethane, o-cumyl resorcinol and phenolphthalein.

4. The polycarbonate according to claim 1, which contains from 60 to 100% by weight, based on the total carbonate bond-constituting units, of carbonate bond-constituting units each containing at least one pendant aromatic group.

5. An optical disc substrate made of the polycarbonate as defined in claim 1.

* * * * *